Jan. 24, 1967  B. W. O. DICKINSON III  3,299,695

ULTRASONIC TESTING APPARATUS

Filed March 26, 1963  4 Sheets-Sheet 1

INVENTOR.
Ben Wade Oakes Dickinson III

Attorneys

INVENTOR.
Ben Wade Oakes Dickinson III
BY
Attorneys

Jan. 24, 1967     B. W. O. DICKINSON III     3,299,695
ULTRASONIC TESTING APPARATUS
Filed March 26, 1963     4 Sheets-Sheet 3

INVENTOR.
Ben Wade Oakes Dickinson III
BY
Attorneys

Jan. 24, 1967   B. W. O. DICKINSON III   3,299,695
ULTRASONIC TESTING APPARATUS
Filed March 26, 1963   4 Sheets-Sheet 4

INVENTOR.
Ben Wade Oakes Dickinson III
BY
Attorneys

United States Patent Office 3,299,695
Patented Jan. 24, 1967

3,299,695
ULTRASONIC TESTING APPARATUS
Ben Wade Oakes Dickinson III, 3290 Jackson St.,
San Francisco, Calif. 94118
Filed Mar. 26, 1963, Ser. No. 268,204
3 Claims. (Cl. 73—67.5)

This application is a continuation-in-part of application Serial No. 151,331, filed November 9, 1961, now U.S. Patent No. 3,186,216.

This invention relates to apparatus for generating and receiving ultrasonic helical waves and in particular to the wave directors utilized in such apparatus.

In order to introduce ultrasonic wave trains from a transducer into the wall of the tubular member at an angle differing substantially from the longitudinal axis of the tubular member so that the wave travels in a helical path, it is necessary to utilize wave directors or offsets which preclude and control undesirable diffraction effects. Wave directors or offsets of the same or similar type are utilized for receiving the helical wave. Such wave directors or offsets heretofore have not been available.

In general, it is an object of the present invention to provide apparatus for generating and receiving ultrasonic helical waves of a controlled orientation which makes use of wave directors or offsets.

Another object of the invention is to provide apparatus of the above character in which the angle of the helical waves received can be very precisely determined.

Another object of the invention is to provide apparatus of the above character which is particular adapted for "go" or "no-go" operation.

Another object of the invention is to provide apparatus of the above character in which the received waves can be identified automatically.

Another object of the invention is to provide an apparatus of the above character which can be readily attached to the object to be tested.

Another object of the invention is to provide wave directors and attenuators which improve the signal to noise ratio of signal reflected from a flaw to the unreflected signal.

Another object of the invention is to provide wave directors and attenuators of the above character which can be readily placed in intimate contact with the subject to be tested.

Additional objects and features of the invention will appear from the following description in which the preferred embodiments are set forth in detail in conjunction with the accompanying drawings.

Referring to the drawings.

In general, my method for non-destructive testing of tubular objects or members consists of transmitting an ultrasonic wave into the tubular object at an angle differing from the longitudinal axis of the tubular object so that the wave travels in a helical path in the wall of the tubular member away from the point of introduction of the ultrasonic wave into the tubular member and receiving the helical wave at a position spaced from the position at which the wave is introduced into the tubular object. The apparatus for introducing and receiving the helical waves includes wave directors or attenuators of particular configurations as hereinafter described.

Figures 1, 2:
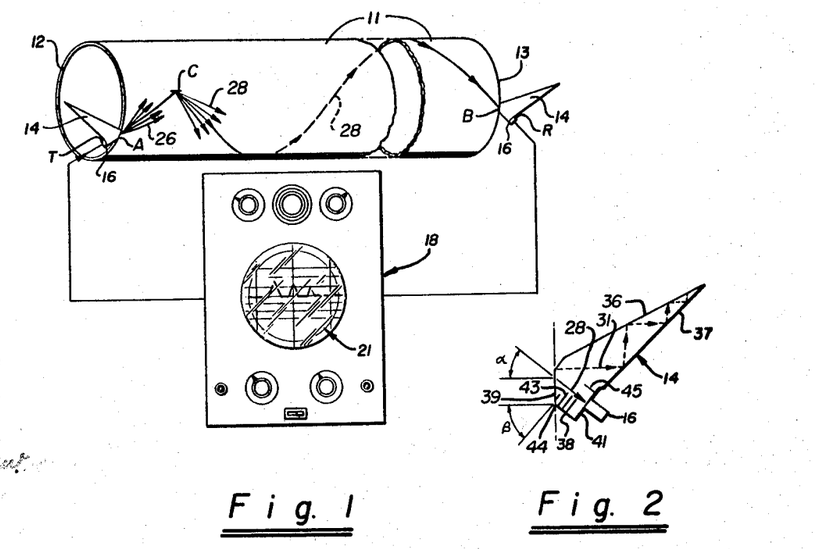
FIGURE 1 is a front elevational view with certain parts schematically illustrated of apparatus incorporating my invention.
FIGURE 2 is an enlarged detail view of the wave directors and offsets utilized in the apparatus shown in FIGURE 1.

In FIGURES 1 and 2, there is disclosed apparatus which is substantially identical to that disclosed in application Serial No. 151,331, filed November 9, 1961, now Patent No. 3,186,216, of which this is a continuation-in-part. A tubular body or object 11 is provided for non-destructive testing. As shown in the drawings, it can be in the form of a pipe as, for example, a pipe having an outside diameter 36 inches and a wall thickness of approximately ⅝ of an inch with ends 12 and 13. A wave director and attenuator 14 which also may be called an offset is mounted on each end of the pipe 11 and has a particular configuration as hereinafter described.

The wave directors 14 are secured to the ends of the pipe in any suitable manner. For example, they can be welded to the ends of the pipe or they can be embedded in the ends of the pipe by the use of sufficient pressure. If the ends of the pipe are smooth, an auxiliary, softer strip of metal such as aluminum foil is introduced between the wave director 14 and pipe 11 so that the strip deforms under pressure to provide a more intimate contact. The primary purpose is to establish intimate solid material contact, i.e., uniform contact between the transducer offset or wave director and attenuator 14 and the walls of the pipe so that there is a good transfer of ultrasonic energy from the offset to the pipe 11, or vice versa, as hereinafter described.

It is generally desirable that the wave directors and attenuators 14 be formed of relatively hard material such as hardened steel so that they can be held against or forcibly pressed into the end or the side of an object with a force which is adequate to deform or upset the generally softer material of the object to be insonated, i.e., filled with ultrasonic waves, to assure a uniform, reproducible low loss continuous metal or solid material path for the desired and selected wave trains. In this manner, the deformed metal of the object being tested serves as a couplant between the ultrasonic wave trains in the wave director and attenuator and the object to be insonated.

An electroacoustic transducer 16 is mounted on each of the wave directors or offsets 14 and may be of any suitable type such as a Type Z transducer manufactured by Branson Instruments, Inc., of Stamford, Conn., or lead metaniobate discs manufactured by General Electric Company. As set forth in copending application Serial No. 245,862, filed December 19, 1962, a suitable impulse ultrasonic wave train source such as an electric arc or explosives may also be used. The transmit transducer is identified with the letter T, whereas the receive transducer is identified with the letter R. The transmit transducer T is energized by pulses or waves from a suitable transmitting, receiving and display apparatus 18 of a conventional type such as a Model 5 Ultrasonic Sonoray manufactured by Branson Instruments, Inc. Alternatively, such apparatus can consist of an E-H Research Laboratories pulser, Model 1512; an E-H Research Laboratories amplifier, Model 1513; a Tektronix oscilloscope, Model 533A; and a Panoramic instrument spectrum analyzer, Model SPA-3. To provide readout with selected and different pass channels, a suitable set of filters or matching circuitry can be used with the received signal to give several channels each at a different frequency.

As is well known to those skilled in the art, such apparatus can produce pulsed waves and can receive the same and display them on a screen 21.

The application of pulses to the transmit transducer T causes ultrasonic wave trains to be formed in the wave director 14 and causes a substantially uncollimated angularly diverging group of ultrasonic wave trains to enter the object 11 at point A as indicated by the waves 26 of only one hand or direction of rotation with respect to the end of the tubular object 11. These wave trains emanate from the offset or director 14 and propagate in a direction which is away from the wave director and follow a helical path around and longitudinally of the wall of the pipe toward the other end of the pipe.

If there is a flaw in the object or pipe 11 as indicated by the flaw C, at least one of the waves 26 will reflect or diffract from the flaw C to provide a substantially uncollimated angularly diverging group of ultrasonic waves 28 which also follow a similar helical path around and longitudinally of the wall of the pipe toward the other end of the pipe but in the opposite hand or direction of the waves 26. One of the reflected or diffracted waves 28 will be received by the receive wave director 14 at point B on the other end of the pipe and by the receive transducer R which converts the ultrasonic wave train to a suitable electrical signal which is transmitted to the apparatus 18.

An enlarged detail view of the offset or wave director and attenuator 14 used in FIGURE 1 is shown in FIGURE 2. As shown, this embodiment of the wave director looks somewhat like a deformed triangle. It is provided with two inclined surfaces 36 and 37. The wave director is also provided with an end wall 38 and a contact face 39. The contact face 39 is adapted to engage the end wall of the pipe as shown in FIGURE 1. The wall 37 is provided with a small recessed face 41 upon which the transducer 16 is mounted. The wave director 14 has a thickness which can be approximately the same as the thickness of the tubular object being tested; for example, for testing pipe having a wall thickness of ⅝ of an inch, the wave director should have approximately the same thickness.

The angle alpha ($\alpha$) between a line perpendicular to the face 41 and a line perpendicular to the face 39 (representative of a ray of the ultrasonic wave train) determines the angle at which the maximum intensity or desirable orientation wave trains are introduced into the end wall of the pipe. The wave trains are not highly collimated but are angularly diverging because it is desired to insonate (irradiate with sound) substantially the entire wall of the pipe. For example, as shown, the angle alpha can be 35°. However, it should be realized that an angle from substantially 0° to substantially 90° can be used if desired, but most applications can most readily utilize an angle from approximately 2° to 55°. In choosing these angles, it should be realized that the helical waves can only increase in length discontinuously, that is, with fixed offsets they can only go from one complete loop to two complete loops because nothing in between is usable or sensed at a fixed receive point on the opposite end of the pipe.

A line which is perpendicular to the face 39 is a line which is also parallel to the longitudinal axis of the tubular member 11. A line which is perpendicular to the face 41 is also parallel to the axis of the transducer 16. There should be a proper balance between the signal attenuation and the path swept by the helix. The greater the angle of the helix, the more loops the helix must make in traversing the length of the pipe, and hence the greater the attenuation of the signal introduced into the pipe. However, the greater the area of the pipe which will be swept by the particular wave train. For example, it is apparent that a helix that makes only one loop in the pipe sweeps less area and sees potential flaw area than a helix which makes two loops or three loops in the same length of pipe. Also, because of the desire to limit the number of receive transducers required, it is desirable to use a beam of ultrasonic waves which are relatively angularly widely dispersed.

The receive wave director 14 discrminates between the reflected wave trains and the unreflected wave trains. This is made possible because the reflected wave trains travel in a hand which is opposite to the direction in which the unreflected wave trains travel. In order to avoid spurious signals from the unreflected wave trains, the wave director 14 includes a wave trap between the surfaces 36 and 37. When an unreflected wave train 31 is trapped, it is reflected back and forth between the surfaces 36 and 37, as shown by the broken lines in FIGURE 2, until it is effectively attenuated. Thus, it can be seen that the receive transducer wave director 14 serves as a means for providing a high signal to noise ratio and a "go" or "no-go" differentiation between the signal reflected by the flaw and an unreflected signal. This application of a wave trap for helical waves of undesired orientation is fundamentally different from wave traps such as are commonly used to attenuate undesired modes originated at the interface between two materials of different acoustic impedance because for a receive condition, the wave trap in my invention receives and attenuates ultrasonic wave trains which enter from the material being tested rather than attenuating a mode created at the interface between two acoustically dissimilar materials. The only reflected ultrasonic wave trains which will be detected by the receive transducer 16 are those which arrive at such an angle that they strike the end of the tested object or pipe 11 at a point a which he wave director is secured to the end of the pipe. For this reason, practically all of the waves which are reflected by the flaw C are dissipated in the end of the pipe because the helices intersect the angle of the pipe at positions which are circumferentially spaced from the position at which the receive wave director 14 is secured to the pipe.

The face 39 has been positioned in such a manner with respect to the face 41 that if an unreflected wave enters the wave director at any point on the face 39 and strikes the face 36 or 37, this unreflected wave even by mode conversion can never reflect from the surface at an angle greater than 90° and for that reason can never excite the transducer 16 to create a spurious flaw signal.

In order to preclude, or at least minimize or control, undesirable diffractcion of the ultrasonic wave trains, means is provided in each of the wave directors 14 and consists of a plurality of parallel slots 43 approximately ¹⁄₁₆ inch wide which are cut through the wave director 14 generally parallel to face 41, and which extend inwardly to a line perpendicular to the face 41. These slots 43 are spaced approximately ¼ inch apart, which spacing is equivalent to about two wavelengths at 2-3 mc. in steel. For the transmit wave director 14, these slots cause wave trains generated by a transmit transducer T, veering towards the end wall 38, to successively diffract as these wave trains intercept each slot end. If these slots were not present, the transmitted wave trains would diffract at edge 44 of the intersection of the wave director contact face and the object 11 to be tested. This diffraction around edge 44 which, to the ultrasonic waves, is a sharp diffracting edge, causes some of the transmitted wave trains to create helical wave trains of opposite rotational direction such as at angle β. These diffracted helical wave trains of opposite direction of rotation move in the same direction as a wave train reflected by a flaw and, therefore, give a false or spurious flaw indication. The use of multiple diffracting slots 43 or diffraction wave traps adequately attenuates wave trains which would otherwise intersect and diffract around the sharp edge 44 and, therefore, serve to attenuate, minimize and control diffracted spurious wave trains.

A slot 44 extends into the body of the wave director adjacent to the transducer face 41 to preclude radiation from entering the right-hand side attenuation area as viewed in FIGURE 2 directly from the transducer 16. The intensity of a transmitted signal reflected complexly within the attenuation area to yield a wave train of opposite helical rotation such as angle β in FIGURE 2 is markedly reduced, and in most cases eliminated. The slot 45 also enhances the acoustic energy entering the object 11 from a transmit transducer. The combined effect of slot 45 and slots 43 is also to provide a controlled collimating device whereby the width of the angular beam of ultrasonic wave trains emanating from transducer 16 and entering the inspected object 11 through contact face 39 is limited by the space between slot 45 and slots 43. Multiple slots and combinations of slots can be used so long as the general arrangement as previously described is maintained.

In some instances, it may be desirable to place the transmit transducer 16 on surface 41 such that no direct wave train path is possible between transmit transducer 16 and the surface 39 contacting the end of the object to be tested. In this way, all signals used to insonate the object to be tested are diffracted signals which have been diffracted around the slots 43. This approach to insonation of the tested object uses controlled diffraction to suitably insonate the object.

Figure 3:
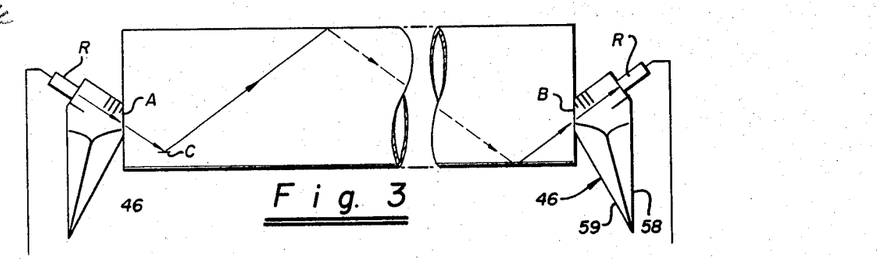
FIGURE 3 is a front elevational view with certain parts schematically illustrated of another apparatus incorporating my invention.

In the wave director and attenuator or offset 14 shown in FIGURE 2, the wave trap is in reality only a two-dimensional wave trap because the unreflected wave train 31 only bounces between the walls 36 and 37. Where it is desired to obtain additional attenuation of the reflected wave trains, a wave director 46 can be utilized which has a three-dimensional wave trap. This wave director 46 is shown in detail in FIGURES 4 and 5 and is formed of a suitable material such as hardened steel and having a suitable thickness approximately the same as the tested object as, for example, ⅜ to ⅝ of an inch and with a width of 2½ inches and a length of 7 inches. The wave director 46 is provided with parallel side surfaces 47 and 48. The wave director also includes a flat surface 49 perpendicular to the surfaces 47 and 48 which is adapted to be attached or pressed into the end wall of the pipe or to be placed on the side of the pipe at a suitable angle as, for example, 35° with respect to a tangent to the side of the pipe at the point of contact as shown in FIGURE 3. It is also provided with a surface 51 which forms a suitable angle with respect to the surface 49 so that the wave trains introduced into the wall of the pipe are introduced at the desired angle. For example, the surface 51 can form an angle of 35° to surface 49 so that the wave trains are introduced into the pipe at an angle of 35°. The transducer T is secured to the surface 51 in any suitable manner such as by means of an adhesive or a bracket (not shown) to provide a good sonic connection between the surface 51 and the transducer T. The wave director 46 is also provided with another substantially flat surface 52 which joins surfaces 49 and 51. Another flat surface 53 is provided and is preferably parallel to the surface 49 and can be utilized for receiving a ram or press so that the surface 49 can be pressed into or against the object to be tested. If desired, a suitable preferentially deformable strip, such as an aluminum foil, may be placed between the wave director and the tested object.

Figures 4, 5:
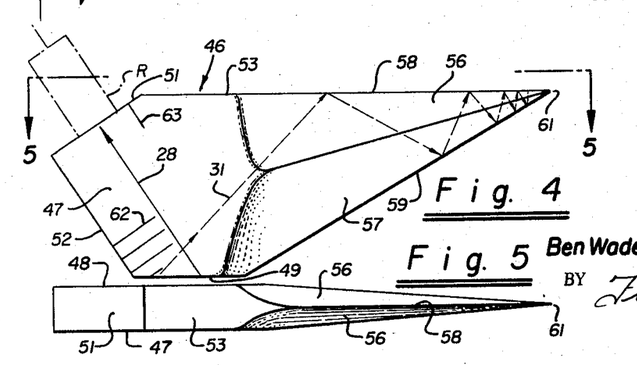
FIGURE 4 is an enlarged side elevational view of the wave director and attenuator utilized in FIGURE 3.
FIGURE 5 is a top plan view of the wave director and attenuator shown in FIGURE 4.

The right-hand extremity of the wave director 46, as viewed in FIGURE 4, is provided with upper and lower inclined surfaces 56 and 57 on each side as viewed in FIGURES 4 and 5. The tapers are formed so that relatively sharp edges 58 and 59 are formed and so that the right-hand end of the wave director and attenuator 46, as viewed in FIGURES 4 and 5, ends in a point 61. In the same manner as for the wave directors 14, a plurality of slots 62 and a slot 63 are provided in the wave directors 46 to preclude and control undesired diffraction effects and to enhance a transmitted signal as hereinbefore explained.

These wave directors and attenuators 46 can be utilized in the same manner as the wave directors and attenuators 14. The unreflected wave trains represented by the line 31 pass into the portion which is diamond-shaped in cross-section of the offset and bounce upon the surfaces 56 and 57. As pointed out previously, the surfaces 56 and 57 are inclined so that the unreflected wave 31 in addition to being bounced up and down, is bounced from side to side as viewed in FIGURES 4 and 5 to thereby cause the wave to pass through more of the atenuating material and to more effectively scatter the unreflected wave to attenuate the wave. The unreflected wave 31, therefore, travels in three dimensions which increases the amount of bouncing mode conversion and the internal scattering to thereby improve the signal to noise ratio of the reflected or bounced wave with respect to the unreflected or unbounced wave.

Figure 6:
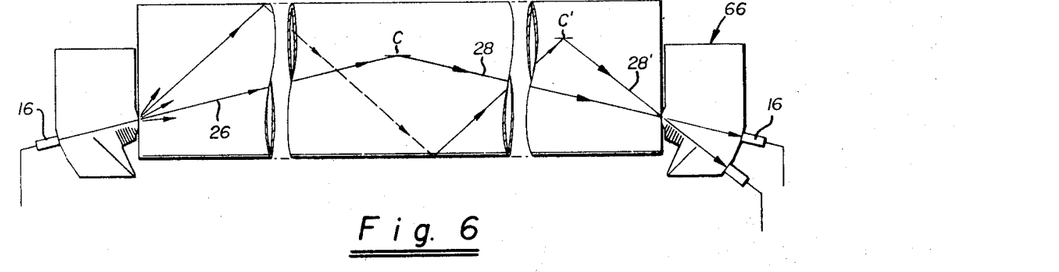
FIGURE 6 is a front elevational view, partially in schematic form, of another embodiment of my invention.
Figure 7:
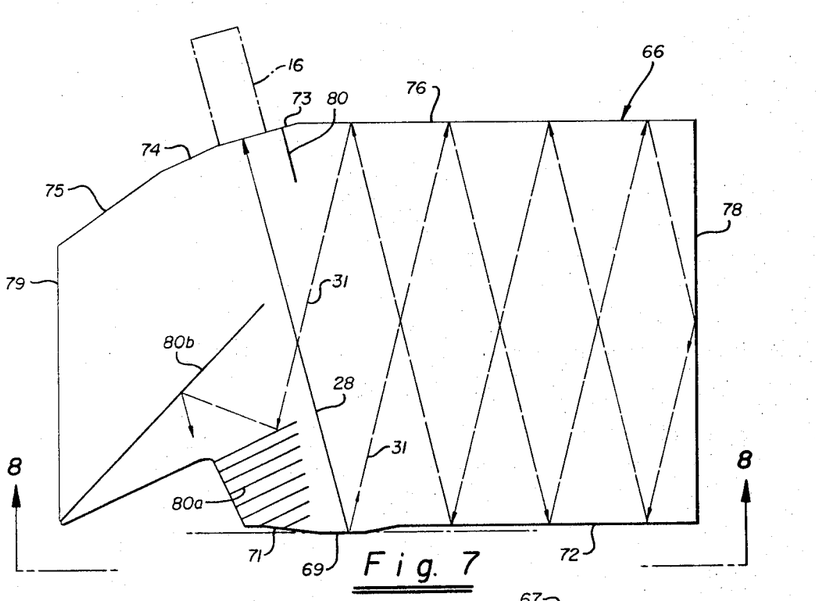
FIGURE 7 is a side elevational view of the wave director and attenuator utilized in FIGURE 6.
Figure 8:
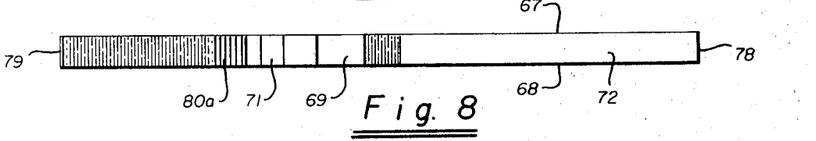
FIGURE 8 is a bottom plan view of the wave director and attenuator shown in FIGURE 7.

In FIGURES 6, 7 and 8, another type of wave director and attenuator or transducer offset is shown. It is substantially rectangular and is formed of a suitable material such as hardened steel. It can be of any suitable size as, for example, a thickness of ⅛ to one inch, a width of approximately 8 inches, and a length of approximately 12 inches. The wave director 66 is provided with flat parallel surfaces 67 and 68. It is also provided with a relatively short, flat surface 69 perpendicular to the surfaces 67 and 68 which is adapted to engage the object to be tested as, for example, the wall of the pipe 11 as shown in FIGURE 6. The wave director is also provided with surfaces 71 and 72 which are recessed above the surface 69 so that only the surface 69 will engage the object being tested. The wave director 66 is provided with flat surfaces 73, 74 and 75 inclined at differing angles which are adapted to receive the transducer 16 as shown. These surfaces 73, 74 and 75 are inclined with respect to the surface 69 for the purpose of introducing the wave train into the object at a desired angle as hereinbefore described. In certain applications, it is desirable to introduce the wave trains into the object at a relatively small angle, and for this reason the surface 73 is inclined with respect to the surface 69 at a relatively small angle, as for example, 7°. The other surfaces 74 and 75 are provided to permit the introduction of wave trains at greater angles. A flat surface 76 is provided on the wave director 66 and can be utilized for pressing the surface 69 of the wave director 66 into intimate contact with the object being tested. The wave director is also provided with end surfaces 78 and 79. The surface 78 can be serrated, heated or coated with sound absorbing material to further attenuate unreflected waves 31.

I have found that the thickness of the transmit wave director directly affects the character and polarization of the generated wave trains. For example, at approximately 2.25–2.5 mc. in steel, the wave length of various modes of complex waves varies between .07"–.1". By using a thin wave director such as .1"–.125" of the design shown in FIGURE 7, it is possible to selectively attenuate some modes of complex waves travelling in the wave director which are polarized with their transverse components generally parallel to sides 72, 76, 78 and 79, and generally perpendicular to sides 67 and 68. Such polarized waves, hereafter referred to as SV, tend to graze sides 67 and 68 and mode convert into predominately shear and longitudinal components which selectively attenuates them. Similarly, complex waves travelling in the wave director which are polarized with their transverse components generally parallel to sides 67 and 68 and generally perpendicular to sides 72, 76, 78 and 79, hereafter called SH, have less interaction with the sides, do not or have less mode conversion and, thereofre, are selectively passed. These SV and SH wave actions can be considered as resulting from the wave director serving as an acoustical wave guide which selectively passes both certain frequencies of complex waves and selectively attenuates certain orientations of polarization of complex acoustic waves.

The face 73 of the wave director and attenuator or offset 66, which is shown in FIGURES 6, 7, and 8 of the drawings, is utlized when it is desired that the reflected helical wave travel through no more than one loop between the transmit and receive wave directors and particularly where it is desired to detect flaws in relatively long tubular members such as in long lengths of pipe as, for example, a pipe 40 feet long. Such an arrangement is particularly desirable where it is necessary to identify pulses automatically as, for example, in equipment in which the first pulse received is a pulse indicating a flaw. The other transducer faces 74 and 75 can be used where a greater helical angle or additional helical loops are desired. As shown in FIGURE 6, for a second flaw such as at C′, the reflected or flaw indicative wave train 28′ is at a greater helical angle and would be sensed by a second receive transducer 16 on the wave director 21 at face 74 at a greater angle with respect to pipe contact fact 69.

In order to keep the number of loops through which the reflected helical wave passes to less than one, it is necessary that the ultrasonic wave trains be introduced at point A at a relatively small angle particularly if the pipe is very long. This is made possible with an offset or wave director such as the wave director 66 shown in FIGURES 6, 7 and 8. Because of the positioning of the transmit transducer on the offset 66, the ultrasonic wave trains will be introduced at an angle determined by the angle of the surface 73 with respect to the surface 69. The reflected wave train 28, as it is received, passes into the wave director 66 and is received by the transducer 16. The unreflected wave train 31 is attenuated by its lossy path through the right-hand side of the wave director as viewed in FIGURE 7 and by successive reflections, mode conversions and interferences, as well as its long path through the wave director 66 creates a longer transit time relative to the reflected wave train 28 so that it may be easily gated out by electronic circuitry.

A slot 80 is formed in the wave director adjacent the face 73 and extends toward the face 69 and precludes wave trains from the transducer 16 from entering the right-hand side of the wave director 66 as viewed in FIGURE 7. (Slot 80 also serves to concentrate more acoustic energy at the pipe contact face 69.) Slots 80a are formed in the wave director 66 generally adjacent to the pipe contact face 69. These slots 80a preclude sound wave trains being transmitted from transmit transducers 16 or surfaces 73, 74 or 75 from diffraction around the point of intersection of the pipe and wave director at the left side of surface 69 and thus creating a false flaw indication signal of opposite helical rotation to that transmitted as previously described. Similarly, a slot 80b, formed in the wave director 66 in the same general direction as the slots 80a, but at a greater angle precludes transmitted unreflected wave trains 31 from bouncing about in the wave director as shown in FIGURE 7 and creating a false flaw indication signal. The same general combination of slots and wave director shape can be used for the receive wave directors with similar value. As previously discussed, for some applications, it is desirable to have the diffraction trap slots 80a of such a length that no direct path for ultrasonic wave trains is possible between surfaces 69 and 73 but diffracted wave trains are utilized which diffract around the right extremity of slots 80a. For the same reason the slot 80 may be placed adjacent the faces 74 and 75 if desired.

If serrations are provided on the surface 78, the serrations should have a dimension which is approximately equal to the wave length of the sound waves. Such a serrated surface tends to further scatter the undesired ultrasonic wave train 31 and to lower its intensity with respect to the generally undamped flaw indicative wave 28 of opposite hand or direction of helical rotation within the insonated object. Any sound absorbing coating placed on the surfaces 67, 68, 72, 76 and 78 will still further attenuate the undesired wave 31.

The surfaces 71 and 72 are spaced above the flat surface 69 to assure proper angle of entry. The surface 69 is relatively small so that the end of the pipe to be engaged can be readily upset or contacted to make possible the intimate contact hereinbefore described between the wave director and the pipe or object to be tested. In order to preclude or control undesirable diffraction effects, a plurality of spaced, substantially parallel slots 80a opening into the faces 69 and 71 are formed in each wave director 66 and may terminate in a line parallel to the path of the ultrasonic wave train in the wave director and generally perpendicular to the faces 73, 74 and 75. These slots operate in the same manner as the slots 43 in the wave directors 14.

In order to enhance the attenuation of unreflected waves, it may be desirable to taper or reduce to a thinner section certain portions of the wave director. For example, the portion of the wave extending to the right as viewed in FIGURE 7 from a line between the face 73 and the face 69 can be tapered or reduced to a thinner section. For polarization of the transmitted wave train, the left-hand side of the wave director can be tapered or reduced to a thinner section. Also to enhance polarization the wave director can be tapered from top to bottom as viewed in FIGURE 7 while still providing a relatively large face for transducer contact.

The offset or wave director 66, shown in FIGURES 6, 7 and 8 is particularly adapted for the testing of drill pipe. One arrangement showing the use of these wave directors or transducers in such an application is shown in FIGURES 9, 10 and 11.

Figures 9, 10, 11:
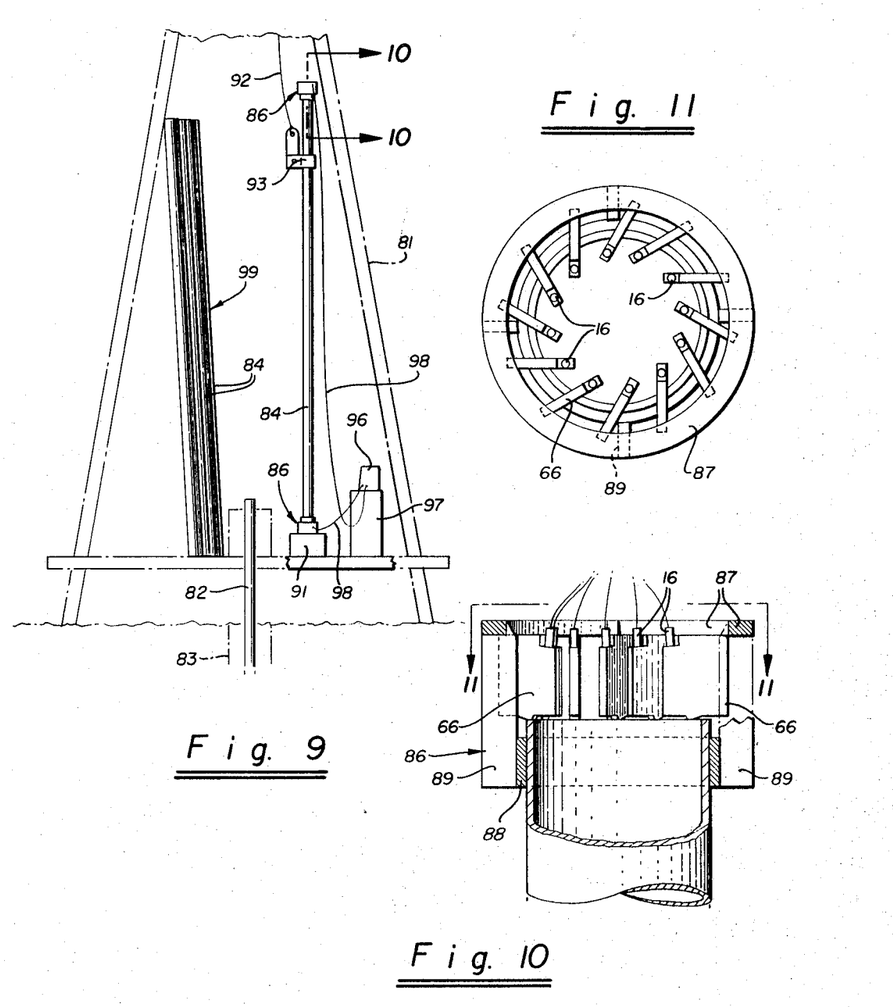
FIGURE 9 is a schematic view of an embodiment of my apparatus particularly adapted for testing of drill pipe.
FIGURE 10 is an enlarged view taken along the line 10—10 of FIGURE 9.
FIGURE 11 is a view taken along the line 11—11 of FIGURE 10.

In FIGURE 9 is shown the conventional derrick 81 utilized for drilling wells. A drill pipe 82 is shown extending down into a well 83. As the drill line is being raised, as for example for the changing of drill bits, the sections 84 as they are removed can be placed in a testing apparatus provided in one side of the drilling rig or derrick 81. This testing apparatus consists of a pair of jigs 86. These jigs consist of a plurality of wave directors 66 which are arranged to contact the ends or sides of the pipe sections. As shown in FIGURE 11, for end contact, a plurality of relatively large offsets or wave directors 66 can be utilized. These wave directors 66 are fastened together by a ring 87 which is secured to the surfaces 76 by suitable means such as welding. Means is provided for guiding the pipe section 84 into contact with the wave director 66 or for guiding the fixture 86 onto the end of the pipe and consists of a loosely fitting ring 88 which is secured to the ring 87 by brackets 89.

In the embodiment shown in FIGURE 9, one of the fixtures or jigs 86 is mounted upon the base 91. After a pipe section has been raised by the block and tackle assembly (not shown) which has a line 92 secured to the pipe section 84 by a pipe clamp 93, the pipe section or joint is unthreaded from the drill string 82 and its lower end is shifted into a position so that it can be lowered on top of the wave directors 66 in the lower jig 86. As soon as this has been accomplished, a separate block and tackle assembly (not shown) can be utilized for lowering the other fixture 86 onto the other end of the pipe section or joint 84. Additional weight can be provided on the upper jig to ensure proper contact between the wave director 66 and the pipe joint.

The signals are applied to the transducers 16 on one of the fixtures 86 from a test apparatus 96 which is mounted on a stand 97 through cables 98. Ultrasonic wave trains are formed which are introduced into the pipe section 84 and travel in a helical path longitudinally of the pipe section 84. If reflected helical wave trains are received by any of the transducers in the fixture 86 mounted on the other end of the pipe, a "no-go" indication will be given by the test apparatus 96. If there are no flaws in the pipe, a "go" indication will be given.

As soon as the pipe has been tested, the upper fixture 86 can be removed and the pipe section or joint 84 lifted out of the lower fixture 86 and the pipe section placed in the pipe stack 99 and located within the derrick 81. Additional sections or joints can be tested in the same manner until all of the sections have been tested.

From the foregoing, it can be seen that it is possible to check objects having a relatively small diameter while still utilizing wave directors or offsets which are relatively large in size merely by positioning them as shown in FIGURES 10 and 11. Alternatively, the wave directors 66 can be positioned against the end of the pipe so that the sides 67 and 68 are parallel to a tangent to the outer circumference of the pipe section 84 and so that the end 78 projects out from the side wall of the section 84.

Figures 12, 13, 14, 15:
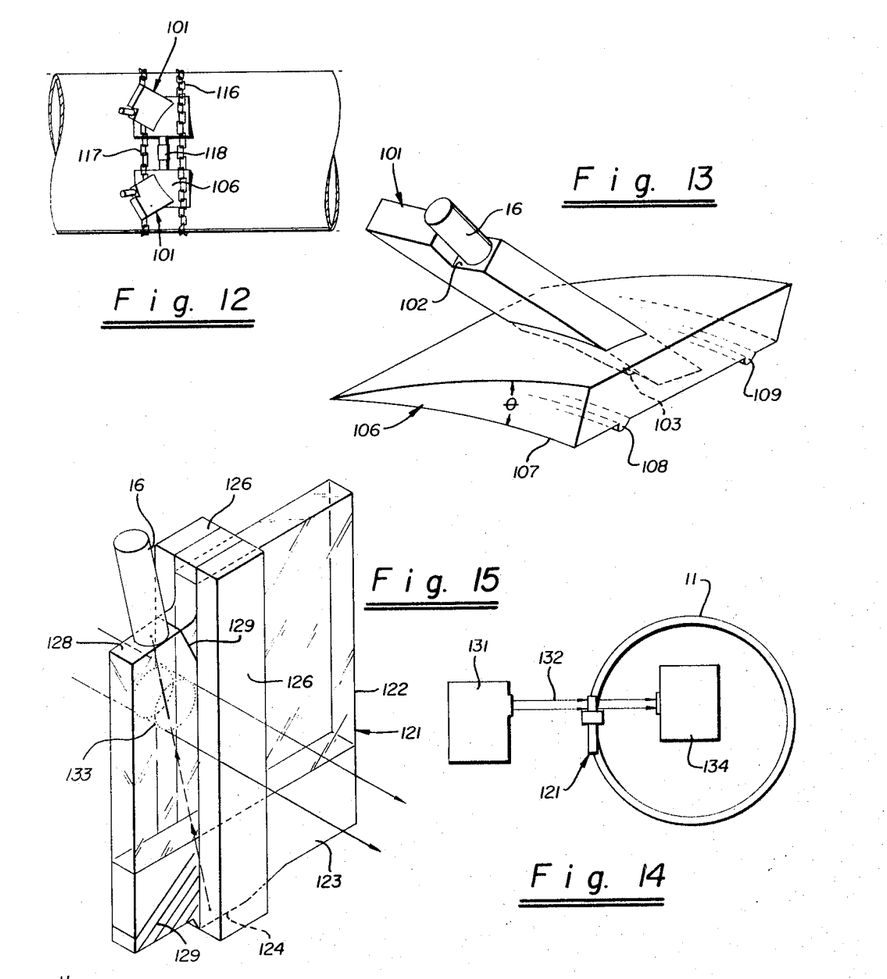
FIGURE 12 is a top plan view of another embodiment of our apparatus incorporating my invention.
FIGURE 13 is an enlarged isometric view of the wave director and attenuator together with the wedge utilized for supporting the same utilized in FIGURE 12.
FIGURE 14 is an end elevational view of still another embodiment of my apparatus incorporating my invention.
FIGURE 15 is an enlarged isometric view of the wave director and attenuator utilized in FIGURE 14.

In FIGURES 12 and 13, there is schematically shown a wave director 101 which is very similar in design performance to the wave director 66. It is provided with an inclined surface 102 adapted to receive a transducer 16. It is also provided with a flat surface 103 which is adapted to make intimate contact with the object to be insonated and which is similar in function to the surface 69 of the transducer 66. Means is provided for mounting the wave directors and attenuators or offsets 101 in intimate contact with objects to be tested and consists of a shoe 106 which is provided with a curved lower surface 107 which corresponds to the curvature of the object 11. The shoe is provided with ridges 108 and 109 on opposite sides. These ridges will firmly engage the surface of the pipe and will serve to stabilize the shoe or wedge 106.

Typically the wave director apparatus shown in FIGURES 12 and 13 is operated by selecting one of the transducers to act as a transmitter and the other transducer to act as a receiver. Thus, a signal transmitted through lower wave director 101 can be reflected from a flaw in a circumferential transverse weld (not indicated, but located to the right of the wave directors as shown in FIGURE 12) to cause a back scattered signal to be sent to the upper wave director 101 which would beceive the same in a manner similar to that shown in parent application U.S. Patent No. 3,186,216, issued June 1, 1965, of which the present application is a continuation-in-part.

As shown in FIGURE 13, the wave director or offset 101 is mounted in the shoe or wedge 106 in such a manner that it forms an angle of 2°–40° with respect to surface 107. It is positioned in this manner so ultrasonic wave trains created by the transducer 16 enters the wall of the pipe 11 at the same angle as if the transducer 101 had been mounted on the end of the pipe.

Means is provided for releasably forcing a pair of wave directors 101 into intimate engagement with the outer walls of the pipe 11 and, as shown in FIGURE 12, consists of a pair of chains 116 and 117 of a suitable type. Preferably, the chains should be noes which have one degree of freedom or less as, for example, chains manufactured by Fairbanks-Morse or Linkbelt. After the chains 116 and 117 have been tightened as much as they can by suitable means (not shown), a hydraulic or pneumatic ram 118 is positioned between the shoes 106. The shoes are pushed apart by the ram with a mechanical advantage equal to the tangent of the angle θ to force the inclined flat face 103 of each of the offsets or wave directors 101 into engagement with the outer surface of the pipe 11 to provide intimate contact between the surface 107 and the outer surface of the pipe 11. In this way, it is possible to apply a very large force to the wave directors 101 to ensure that an excellent contact is made between the wave directors and the pipe.

As explained in copending application Serial No. 151,331, now Patent No. 3,186,216, filed November 9, 1961, such an arrangement can be readily utilized for checking girth welds in a pipe. However, it is also apparent that, if desired, such an arrangement can be utilized for checking for flaws anywhere in the pipe merely by positioning offsets 101 at longitudinally spaced positions on the pipe 11 in a manner similar to that hereinbefore described. The mode of operation is very similar to that hereinbefore described with the exception that the helical waves are introduced and received in the side walls of the pipe rather than in the ends of the pipe.

The primary advantage of the arrangement shown in FIGURE 12 is that the wave directors can be readily removed and shifted along the pipe as desired. The apparatus is also of the type which can be utilized in the field.

By using a suitable expanding mandrel, the wave directors 101 may be forced against the inside diameter of a tubular object to effect a simulated end contract from the side in the same fashion as for the outside side mounted wave director.

In FIGURES 14 and 15, there is shown another offset or wave director 121 which is similar to the configuration of the offset 66 shown in FIGURES 7 and 8. However, in this case, the main body 122 of the offset or wave director 121 is formed of a suitable translucent or transparent material such as glass or plastic. A wear shoe 123 of a suitable material such as steel is secured to the lower part of the glass portion 122. This wear shoe 123 is provided with a flat surface 124 which is adapted to be positioned in intimate contact with the object to be tested. A pair of struts 126 are provided on opposite sides of the glass portion 122 and the wear shoe 123 and have their lower extremities secured to the wear shoe. These struts 126 terminate at the upper portion of the glass portion 122 and make it possible to apply relatively large forces to the wear shoe 123 through the struts to force the flat surface 124 into intimate contact with the body or object 11 to be tested. A flat surface 128 is provided for receiving a transducer 16 if it is required and serves the same purpose as surfaces 73, 74 and 75 of the embodiment shown in FIGURES 7 and 8. This surface 128 is positioned at an angle with respect to the flat surface 124 so that if the wave director 121 is utilized for a transmitting transducer, the ultrasonic wave trains will be introduced into the object 11 at an angle which differs from the longitudinal axis of the tubular members so that the ultrasonic wave trains will travel in a helical path longitudinally of the pipe.

The wave director 45 is provided with antidiffraction shielding and collimation slots 129 which are positioned in the same manner and serve the same function as the slots 80, 80a and 80b in the embodiment shown in FIGURES 7 and 8.

When the wave director 121 is utilized for the reception of reflected or bounced wave trains 28 as shown particularly in FIGURE 15, the reflected ultrasonic wave train 28 will travel through the metal shoe 123 and into the glass upper portion 122. The sound waves, as they enter the glass portion 122, serve as a source of compression and rarefaction to vary slightly the local index of refraction of the glass during the passage of the sound wave.

The exact position of the sound wave within the wave directors 121 can be determined by use of a polarized light source 131 which shines a beam of polarized light 132 onto and through the wave director 121 as indicated by the spot 133. In comparing the observed position within the glass with that of the wave train being inspected, account must be taken of the refraction between the shoe 123 and the glass 122. As is well known to those skilled in the art, polarized light in one plane of transverse vibration can be considered to be composed of two mutually perpendicular component vibrations. When any phase difference is introduced between them by causing one to be retarded by passing through a longer or more dense (higher refractive index) optical path than does the other, various degrees of elliptical polarization are produced. This elliptical polarization causes a variation in intensity of the transmitted polarized light which can be sensed by suitable means such as a photo-sensitive sensing device 134 positioned on the other side of the wave director 121. As the index of refraction of the glass is changed in the area 133 through which the beam 132 passes by the ultrasonic wave train 128 which also passes through the area beneath the spot, the plane of polarization is rotated depending upon the intensity of the compression rarefaction. Thus, by means of the photosensitive sensing apparatus 134, it is possible to immediately determine when an ultrasonic wave train 28 is passing through the spot 133 covered by the polarized light beam 132.

By utilizing a relatively small spot, it can be seen that it is possible to determine the precise angle and position of the received wave train 28. For example, it is possible to utilize a spot as small as one-thousandth of an inch. It can be seen that this gives a great advantage in determining the angle of receipt of the wave train 128. With conventional piezoelectric transducers, the size of the transducer is relatively large as, for example, one-half inch in diameter so that it is only possible to determine the position of the receive wave train within one-half inch.

From the foregoing, it can be seen that the polarized light source 131 together with the photosensitive apparatus 134 serves as an effective transducer which is much more sensitive to the angle and intensity of the wave train. Because of this ability to more precisely locate the desired wave reflected wave train 28, it is possible to tolerate a lower signal to noise ratio between the bounced flaw indicative waves and the unbounced spurious wave trains.

The optical properties of the translucent material utilized such as glass can be locally and continuously varied more easily than the sonic properties of metal so that additional bounced wave discrimination can be built into the transparent or translucent material utilized for the offset.

Figure 16:
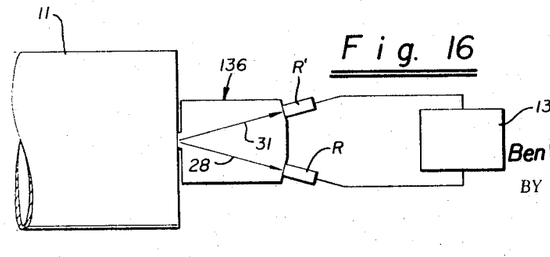
FIGURE 16 is a front elevational view showing still another embodiment incorporating my invention.

In FIGURE 16, there is shown another offset or wave director 136 which is similar to the wave director 66. It is provided with two transducers identified as R and R'. The transducer R is positioned so that it will only receive a reflected or flaw indicative wave train. The signal from the receive transducer R is supplied to a ratiometer or comparator 137 together with a signal which is supplied by the receive transducer R'. R' is positioned so as to receive only unbounced helical waves directly from a transmit transducer system on the opposite end of the pipe 11. Since the unbounced helical wave is substantially constant in intensity, the signal received by the receive transducer R is affected only by the variation in contact at point B between the wave director 136 and the pipe 11, or by a variation in contact of the transmit wave director on the opposite end of the pipe. The result is that the ratio between the signals between R and R' is the direct measure of the intensity of the reflected or flaw indicative signal and, in turn, the size of a flaw which is independent of contact variations between the wave director and the pipe.

Information can also be obtained about the flaw size and its geometry by the use of different transmit frequencies. The amplitude and the wave length of a sonic wave train reflected from the flaw is a relative function of the wave length and flaw size. Therefore, the received pulse, i.e., its shape and height as a function of wave train frequency can be similarly interpreted to provide data concerning the flaw size and shape and orientation.

It is apparent from the foregoing that I have provided a new and improved apparatus for generating and receiving helical waves. In particular, I have provided wave directors which are particularly useful in systems for automatic operation which give a "go" or "no-go" indication. Wave directors or offsets have been provided which make it possible to greatly increase the signal to noise ratio between the bounced and unbounced wave trains and also to more particularly determine the exact angle or receipt of the bounced or flaw indicating wave trains.

I claim:

1. In apparatus for the ultrasonic non-destructive testing of lengths of pipe having accessible ends to determine the existence of flaws therein, first and second wave director assemblies adapted for engaging opposite ends of the pipe, each of said wave director assemblies including a plurality of wave directors, each of said wave directors comprising a body having an output surface adapted to engage the end of the pipe and an input surface spaced from the output surface, the body of each of said wave directors having an attenuating portion adjoining the region between the input and output surfaces, a transducer for each wave director, each of the transducers mounted to pass ultrasonic wave trains through the body of the wave director and through the input surface, the wave directors being further constructed so that each wave director transmits or receives ultrasonic wave trains at a substantial angle to the output surface, each of said first and second wave director assemblies having means for mounting the wave directors in an array in which the output surfaces lie facing in a single direction and are adapted to conform to the shape of the end of the pipe, the wave directors in the array being arranged so that the output surfaces thereof are spaced apart and therefore adapted to engage spaced apart portions about the end of the pipe, the wave directors within each array being similarly positioned with respect to the wall of the pipe, the tangent to the wall of the pipe being taken as a reference, the wave directors of one assembly transmitting or receiving ultrasonic wave trains through the pipe in helical direction opposite to that of the other assembly, means for energizing the transducers on one of said assemblies for generating ultrasonic wave trains which are introduced into the pipe and travel in helical paths, flaws in the pipe reflecting some wave trains into an opposite direction and therefore receivable by one of the wave directors of said other wave director assembly, means for providing an indication when any of said other wave directors receive such reflected helical wave trains.

2. In apparatus for the ultrasonic non-destructive testing of lengths of pipe having accessible ends to determine the existence of flaws therein, first and second wave director assemblies adapted for engaging opposite ends of the pipe, each of said wave director assemblies including a plurality of wave directors, each of said wave directors comprising a body having an output surface adapted to engage the end of the pipe and an input surface spaced from the output surface, the body of each of said wave directors having an attenuating portion adjoining the region between the input and output surfaces, a transducer for each wave director, each of the transducers mounted to pass ultrasonic wave trains through the body of the wave director and through the input surface, the wave directors being further constructed so that each wave director transmits or receives ultrasonic wave trains at an angle to the longitudinal axis of the pipe, each of said wave director assemblies having means for mounting the wave directors in an array in which the output surfaces lie facing in a single direction and are adapted to conform to the shape of the end of the pipe, said mounting means including a rigid ring secured to the attenuating portions of each wave director of the array and further including means secured to the ring for guiding the array into cooperative engagement with the end of the pipe and for retaining the array on the pipe, the wave directors within each array being similarly positioned with respect to the wall of the pipe, the tangent to the wall of the pipe being taken as a reference, the wave directors of one assembly transmitting or receiving ultrasonic wave trains through the pipe in a helical direction opposite to that of the other assembly, means for energizing the transducers on one of said assemblies to generate ultrasonic wave trains which are introduced into the pipe and travel in helical paths, flaws in the pipe reflecting some wave trains into an opposite direction and therefore receivable by one of the wave directors of said other wave director assembly.

3. Apparatus as in claim 2 in which said guide means comprises a sleeve having an inside diameter slightly greater than the pipe to be tested, a plurality of brackets securing said sleeve to said ring, the output surfaces of each array being arranged in coaxial alignment with said sleeve so that when the sleeve is passed over the end of the pipe the output surfaces engage the end of the pipe.

References Cited by the Examiner

UNITED STATES PATENTS

| | | | |
|---|---|---|---|
| 2,628,335 | 2/1953 | Drake | 73—67.7 X |
| 2,953,017 | 9/1960 | Bincer et al. | 73—67.8 |
| 2,984,756 | 5/1961 | Bradfield | 73—67.5 X |
| 3,052,115 | 9/1962 | Renaut et al. | 73—67.5 |
| 3,186,216 | 6/1965 | Dickinson | 73—67 |

FOREIGN PATENTS

| | | |
|---|---|---|
| 678,710 | 9/1952 | Great Britain. |
| 703,511 | 2/1954 | Great Britain. |
| 723,112 | 2/1955 | Great Britain. |
| 765,906 | 1/1957 | Great Britain. |
| 772,083 | 4/1957 | Great Britain. |

RICHARD C. QUEISSER, *Primary Examiner.*

J. P. BEAUCHAMP, *Assistant Examiner.*